(12) United States Patent
Tarver et al.

(10) Patent No.: US 11,824,692 B2
(45) Date of Patent: Nov. 21, 2023

(54) EQUALIZER DIGITAL SELF-INTERFERENCE CANCELATION FOR MIMO TRANSMITTERS

(71) Applicant: Samsung Electronics Co., Ltd., Suwon-si (KR)

(72) Inventors: Chance Tarver, Arlington, TX (US); Matthew Tonnemacher, Allen, TX (US); Khurram Muhammad, Southlake, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 17/537,293

(22) Filed: Nov. 29, 2021

(65) Prior Publication Data

US 2022/0329466 A1    Oct. 13, 2022

Related U.S. Application Data

(60) Provisional application No. 63/171,756, filed on Apr. 7, 2021.

(51) Int. Cl.
    *H04B 1/44*     (2006.01)
    *H04L 25/03*    (2006.01)
    *H04B 7/0413*   (2017.01)

(52) U.S. Cl.
    CPC ........ *H04L 25/03891* (2013.01); *H04B 1/44* (2013.01); *H04B 7/0413* (2013.01)

(58) Field of Classification Search
    USPC ................................ 375/219, 229, 295, 316
    See application file for complete search history.

(56) References Cited

U.S. PATENT DOCUMENTS

| | | | |
|---|---|---|---|
| 7,711,329 B2 | 5/2010 | Aparin et al. | |
| 8,135,348 B2 | 3/2012 | Aparin | |
| 8,364,074 B2 | 1/2013 | Park et al. | |
| 9,407,298 B1* | 8/2016 | Hwang | H04B 1/10 |
| 2015/0280946 A1 | 10/2015 | Sabouri et al. | |

(Continued)

FOREIGN PATENT DOCUMENTS

CN          105324953 B          11/2020

OTHER PUBLICATIONS

International Search Report and Written Opinion dated Apr. 21, 2022 regarding International Application No. PCT/KR2022/000352, 7 pages.

*Primary Examiner* — Shawkat M Ali

(57) ABSTRACT

An apparatus is configured to perform a method for self-interference cancelation (SIC). In one embodiment, an apparatus is provided. The apparatus includes a transceiver, a first number of transmit antennas, a second number of receive antennas, an equalizer, and SIC circuitry. The equalizer is configured to, for at least one receive antenna of the second number of receive antennas: receive feedback signals, wherein a feedback signal is received from each of the first number of transmit antennas; and calculate, based on the feedback signals and an equalizer function, a self-interference (SI) estimate for the at least one receive antenna. The SIC circuitry is configured to, for the at least one receive antenna of the second number of receive antennas, subtract the SI estimate from a signal received at the at least one of the second number of receive antennas to obtain a residual signal.

20 Claims, 10 Drawing Sheets

(56) References Cited

U.S. PATENT DOCUMENTS

2017/0041060 A1    2/2017   Kim et al.
2020/0252115 A1    8/2020   Paramesh et al.
2020/0343934 A1   10/2020   Weissman et al.
2020/0382148 A1   12/2020   Maleki et al.
2021/0075464 A1    3/2021   Luo

* cited by examiner

In MIMO, multiple transmitted DL signals will interfere with a single received UL signal.

EQUALIZER DIGITAL SELF-INTERFERENCE CANCELATION FOR MIMO TRANSMITTERS

CROSS-REFERENCE TO RELATED APPLICATIONS AND CLAIM OF PRIORITY

The present application claims priority to U.S. Provisional Patent Application No. 63/171,756 filed on Apr. 7, 2021. The content of the above-identified patent document is incorporated herein by reference.

TECHNICAL FIELD

The present disclosure relates generally to wireless communication systems and, more specifically, the present disclosure relates to an equalizer assisted self-interference canceler for multi-antenna systems.

BACKGROUND

Traditionally, modern cellular communication systems operate within two main modes; Time Division Duplexing (TDD) and Frequency Division Duplexing (FDD). There are several tradeoffs between TDD and FDD systems. TDD systems split uplink (UL) and downlink (DL) in the time domain, while FDD systems split uplink and downlink in frequency domain. Therefore, UL in TDD system operates at a duty cycle (less than 100% of time) while UL in FDD system operates 100% of time but requires a separate band. Furthermore, FDD system requires isolation between transmit (TX) and receive (RX) as both are operated simultaneously. The isolation is achieved using duplexers and/or separate antennas.

SUMMARY

The present disclosure relates to wireless communication systems and, more specifically, the present disclosure relates to an equalizer assisted self-interference canceler for a multi-antenna system.

In one embodiment, an apparatus is provided. The apparatus includes a transceiver configured to communicate via an uplink channel and a downlink channel concurrently. The apparatus also includes a first number of transmit antennas, a second number of receive antennas, an equalizer, and self-interference cancel (SIC) circuitry. The equalizer is configured to, for at least one receive antenna of the second number of receive antennas: receive feedback signals, wherein a feedback signal is received from each of the first number of transmit antennas; and calculate, based on the feedback signals and an equalizer function, a self-interference (SI) estimate for the at least one receive antenna. The SIC circuitry is configured to, for the at least one receive antenna of the second number of receive antennas, subtract the SI estimate from a signal received at the at least one of the second number of receive antennas to obtain a residual signal.

In another embodiment, a method is provided. The method includes transmitting, by a transceiver configured to transmit an uplink channel and a downlink channel concurrently, one or more signals, the transceiver including a first number of transmit antennas and a second number of receive antennas. The method also includes, for at least one receive antenna of the second number of receive antennas, receiving, by an equalizer, feedback signals, wherein a feedback signal is received from each of the first number of transmit antennas; calculating, an equalizer based on the feedback signals and an equalizer function, a self-interference (SI) estimate for the at least one receive antenna; and subtracting, in a self-interference cancel (SIC) circuitry, the SI estimate from a signal received at the at least one of the second number of receive antennas to obtain an residual signal.

In yet another embodiment, a non-transitory computer readable medium is provided. The non-transitory computer readable medium a plurality of instructions that, when executed by at least one processor, cause the processor to transmit, via a transceiver configured to transmit an uplink channel and a downlink channel concurrently, one or more signals, the transceiver including a first number of transmit antennas and a second number of receive antennas. The instructions further cause the processor to, for at least one receive antenna of the second number of receive antennas: receive feedback signals, wherein a feedback signal is received from each of the first number of transmit antennas; calculate based on the feedback signals and an equalizer function, a self-interference (SI) estimate for the at least one receive antenna; and subtract the SI estimate from a signal received at the at least one of the second number of receive antennas to obtain a residual signal.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
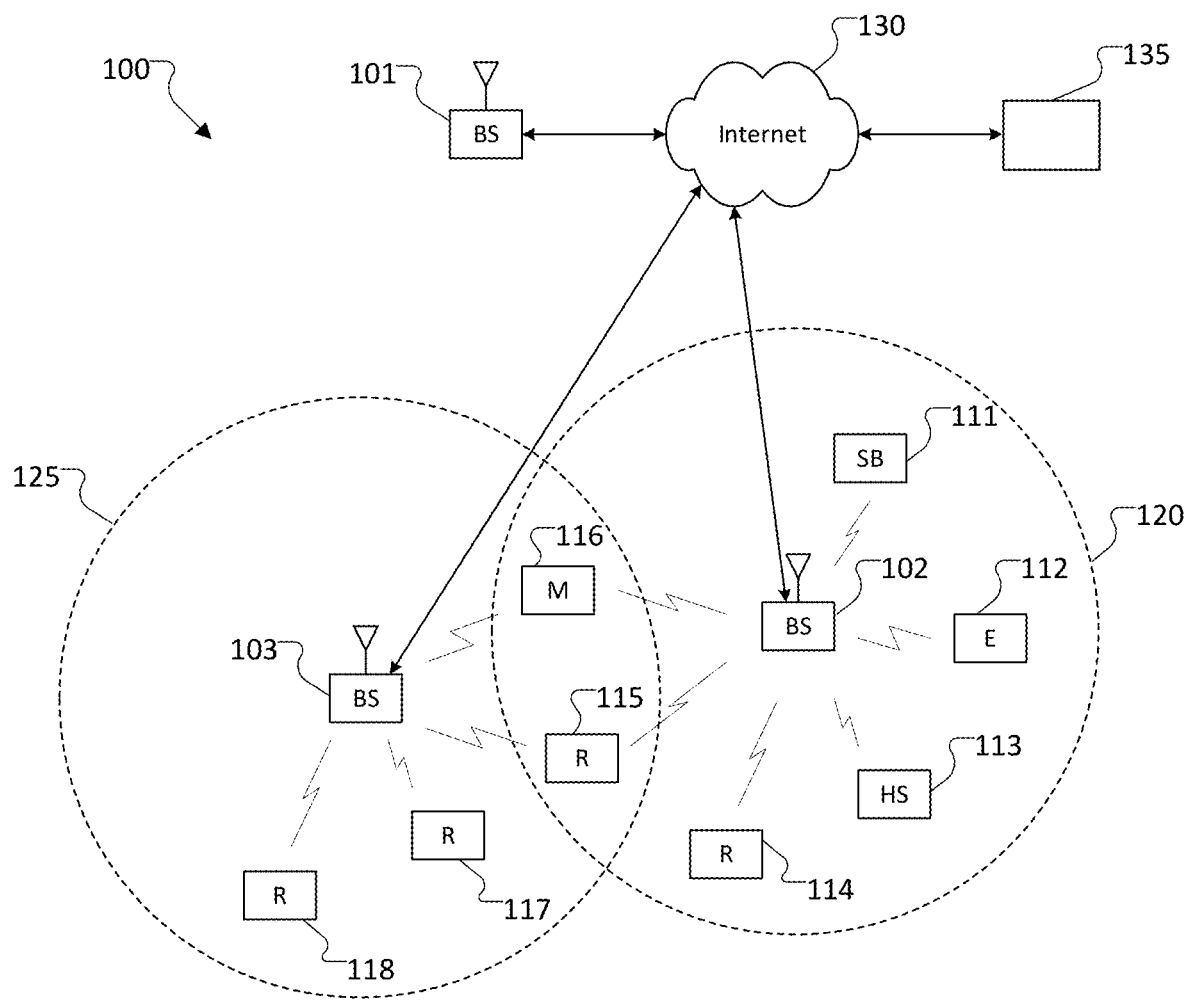
FIG. 1 illustrates an example wireless network according to embodiments of the present disclosure.

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

As indicated herein above, modern cellular communication systems operate within two main modes; Time Division Duplexing (TDD) and Frequency Division Duplexing (FDD) and there are several tradeoffs between TDD and FDD systems. Additionally, mobile terminals, such as user equipments (UEs) have limited output power, which can be 23 dBm in cellular communication links. The limited output power of the UEs can constrain the coverage as the uplink (UL) power is distributed across an entire bandwidth (BW) for an allocated proportion of time. The power spectral density of output power is lower and reaches a lower distance; thereby, causing a lower coverage range, which can be an issue with cell site planning as more base stations are required to cover an area. TDD systems are simpler to implement have the advantage of using just one chunk of band for both UL and downlink (DL). TDD does not required paired bands for operation as TDD can use the entire band.

Embodiments of the present disclosure provide a transceiver architecture that is configured to remove a leakage value, which occurs from a transmit signal, from a received signal. Certain embodiments of the present disclosure provide equalizer circuit before a self-interference canceler to alleviate a frequency response introduce by a channel distortion occurring between a transmit antenna and a receive antenna.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another or can operate as standalone schemes.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
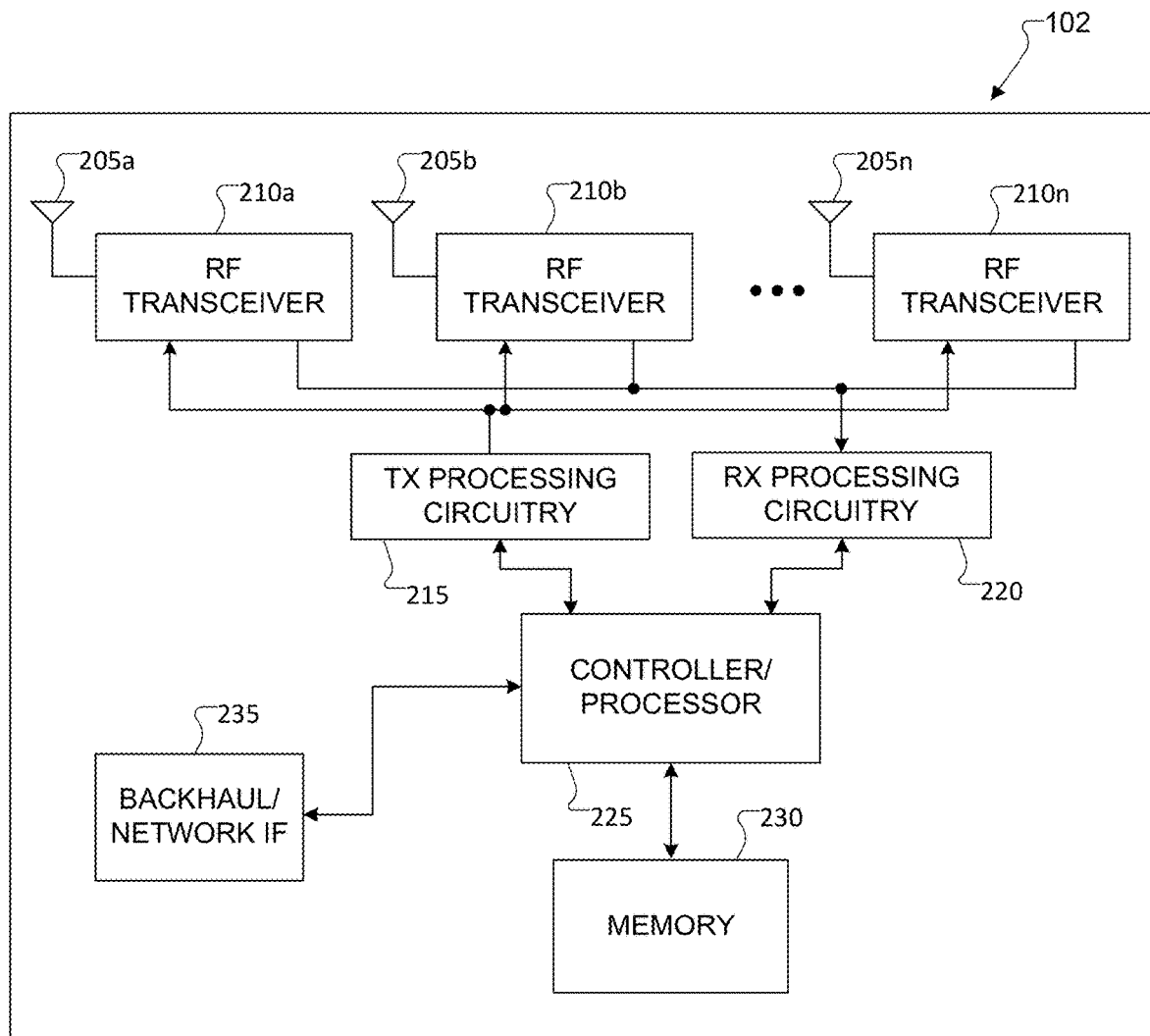
FIG. 2 illustrates an example gNB according to embodiments of the present disclosure.
Figure 3:
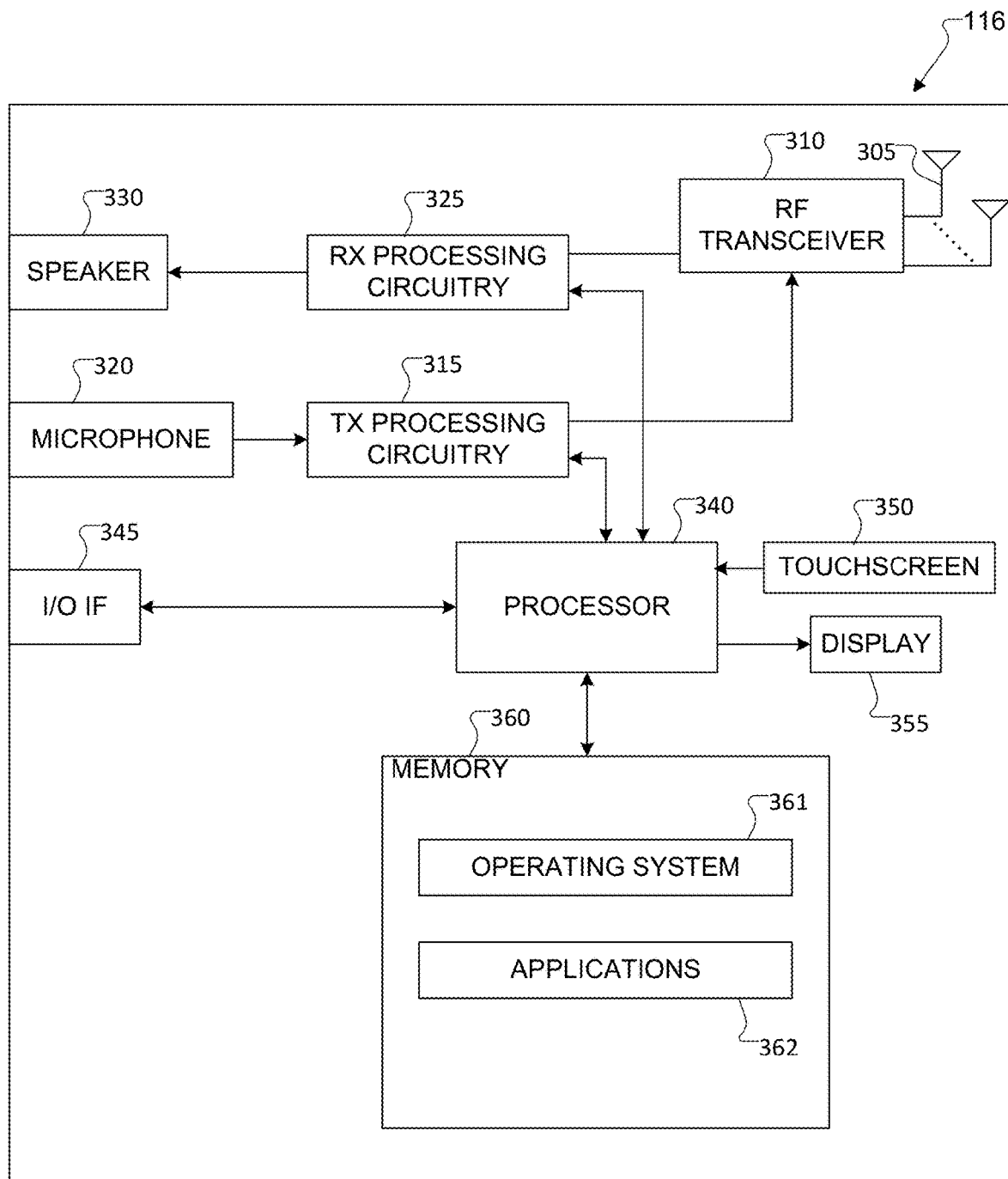
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

Certain embodiments of the disclosure may be derived by utilizing a combination of several of the embodiments listed below. Also, it should be noted that further embodiments may be derived by utilizing a particular subset of operational steps as disclosed in each of these embodiments. This DOI should be understood to cover all such embodiments.

Certain embodiments of the present disclosure are described assuming cellular DL communications. However, the same/similar principles and related signaling methods & configurations can also be used for cellular UL & sidelink (SL).

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one core network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116 as well as a UE 117, which may be located in a third residence (R), and a UE 118, which may be located in another residence (R). In some embodiments, one or more of the gNBs 101-103 may communicate with each other and with the UEs 111-118 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include a two-dimensional (2D) antenna arrays as described in embodiments of the present disclosure. In some embodiments, one or more of gNB 101, gNB 102 and gNB 103 support the codebook design and structure for systems having 2D antenna arrays.

As described in more detail below, one or more of the gNBs 101-103 include circuitry, programing, or a combination thereof, for performing the audit correction to obtain a result based on a computed score for each candidate value of the one or more of the BS configuration parameters; generating, based on the result, one or more corrective actions; and adjusting at least one of the BS configuration parameters based on the one or more corrective actions.

In certain embodiments, gNB 102 may be connected to the core network 130 by a fiber/wired backhaul link. As indicated herein above, gNB 102 serves multiple UEs 111-116 via wireless interfaces respectively. Using this wireless interface, a UE 116 receives and transmit signals to gNB 102. Using signals received from a non-serving gNB 103, a UE 116 may also receive signals from a neighboring gNB 103. The core network 130 may further include a core network entity (CNE) 135, which responsible for the task of site audit correction, as described herein below. In certain embodiments, the CNE 135 is a base station, such as gNB 103.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing. The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n. In certain embodiments, the RF transceivers 210a-210n perform transmission and reception via radio waves or wired communications. For example, communications may be accomplished via wired connections, optical fiber systems, communication satellites, radio waves, and the like.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform a blind interference sensing (BIS) process, such as performed by a BIS algorithm, and decode the received signal subtracted by the interfering signals. Any of a wide variety of other functions can be supported in the gNB 102 by the controller/processor 225. In some embodiments, the controller/processor 225 includes at least one microprocessor or microcontroller In certain embodiments, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as a BIS algorithm is stored in memory 230. The plurality of instructions is configured to cause the controller/processor 225 to perform the generation and calibration of a signal strength prediction in a wireless communication system.

As described in more detail below, the transmit and receive paths of the gNB 102 (implemented using the RF transceivers 210a-210n, TX processing circuitry 215, and/or RX processing circuitry 220) support generation and calibration of a signal strength prediction in a wireless communication system.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350 (or key pad), a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UL transmission on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
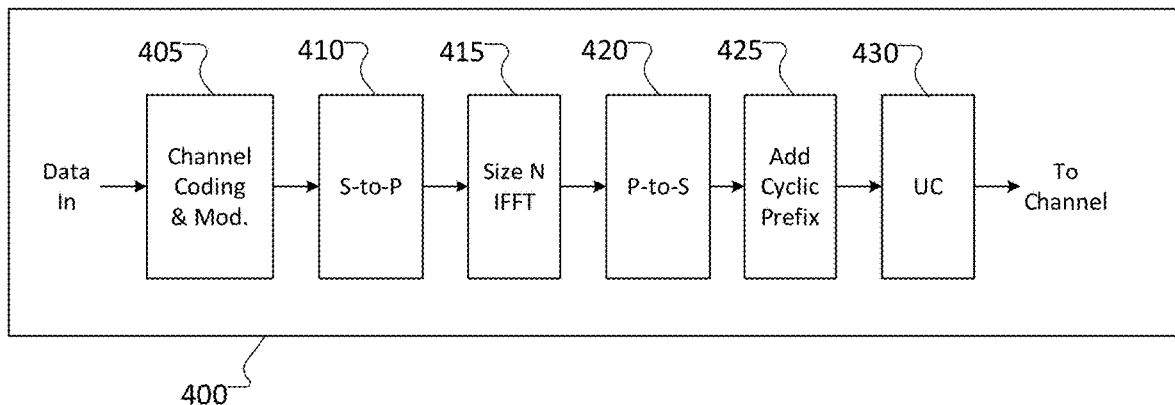
FIG. 4A illustrates a high-level diagram of an orthogonal frequency division multiple access transmit path according to embodiments of the present disclosure.
Figure 4B:
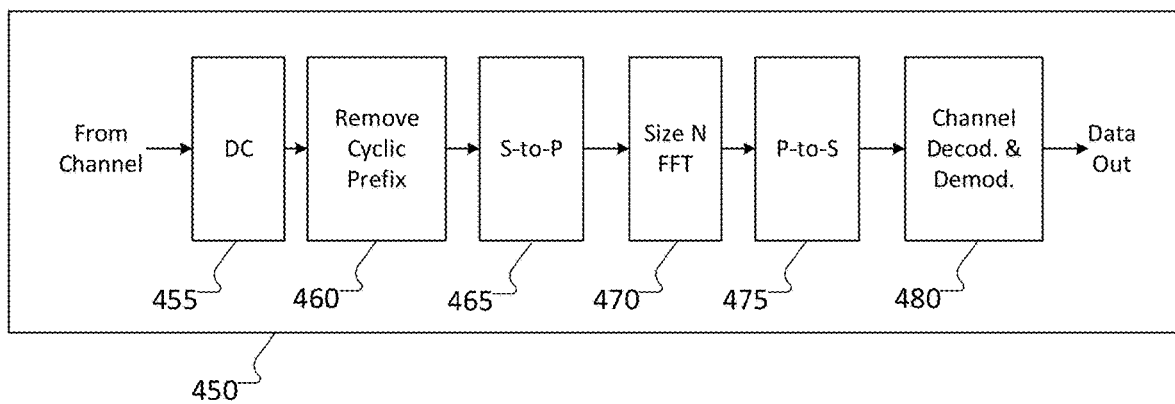
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

Figure 5:
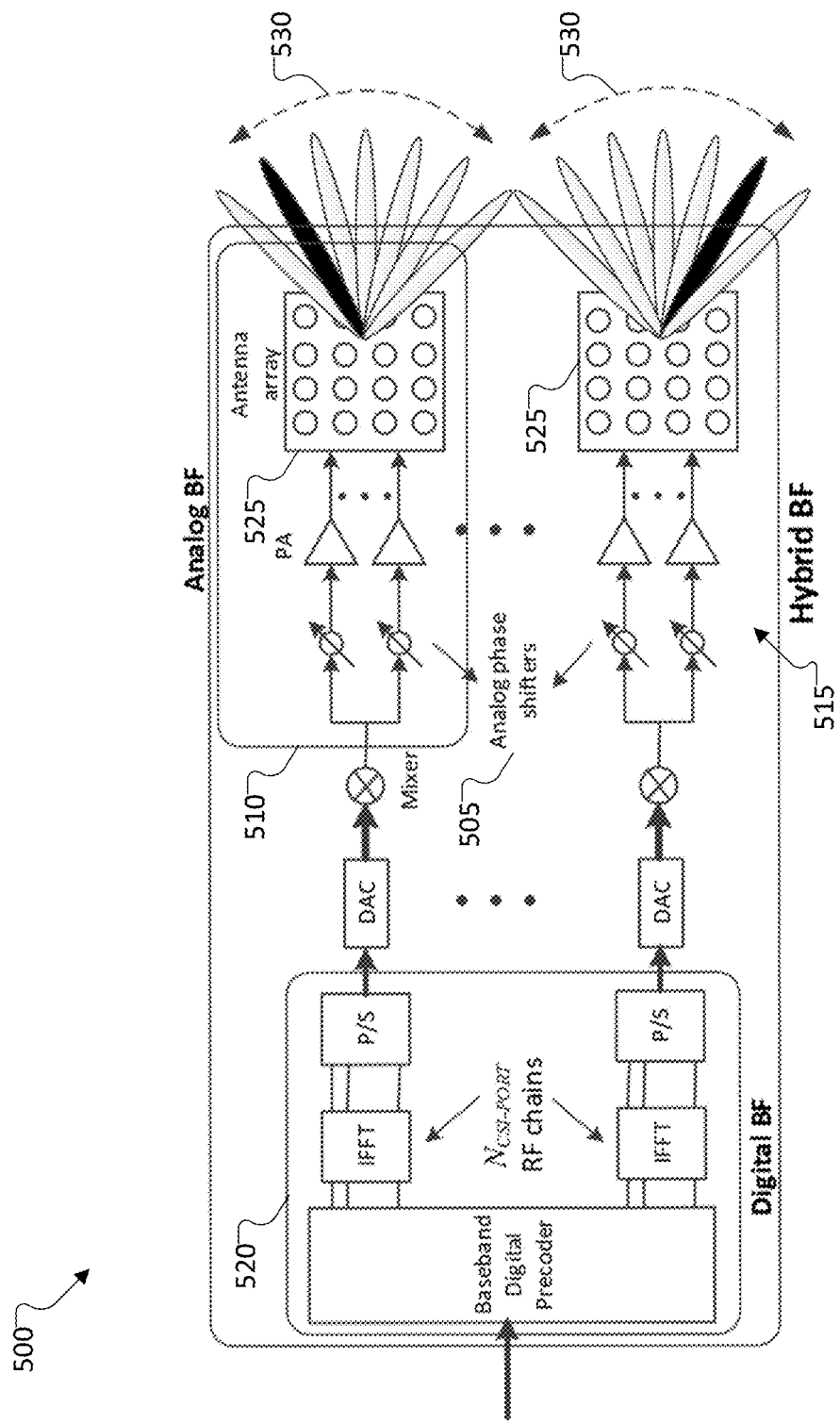
FIG. 5 illustrates an example antenna according to embodiments of the present disclosure.

FIG. 5 illustrates an example antenna blocks 500 according to embodiments of the present disclosure. The embodiment of the antenna 500 illustrated in FIG. 5 is for illustration only. FIG. 5 does not limit the scope of this disclosure to any particular implementation of the antenna 500. In certain embodiments, one or more of gNB 102 or UE 116 include the antenna 500. For example, one or more of antenna 205 and its associated systems or antenna 305 and its associated systems can be configured the same as antenna 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies).

In the example shown in FIG. 5, the antenna 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports $N_{CSI-PORT}$. A digital BF 515 performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the antenna 500 system is also applicable to higher frequency bands such as >52.6 GHz (also termed the FR4). In this case, the system can employ only analog beams. Due to the O2 absorption loss around 60 GHz frequency (~10 decibels (dB) additional loss @100 m distance), larger number of and sharper analog beams (hence larger number of radiators in the array) will be needed to compensate for the additional path loss.

Figure 6:
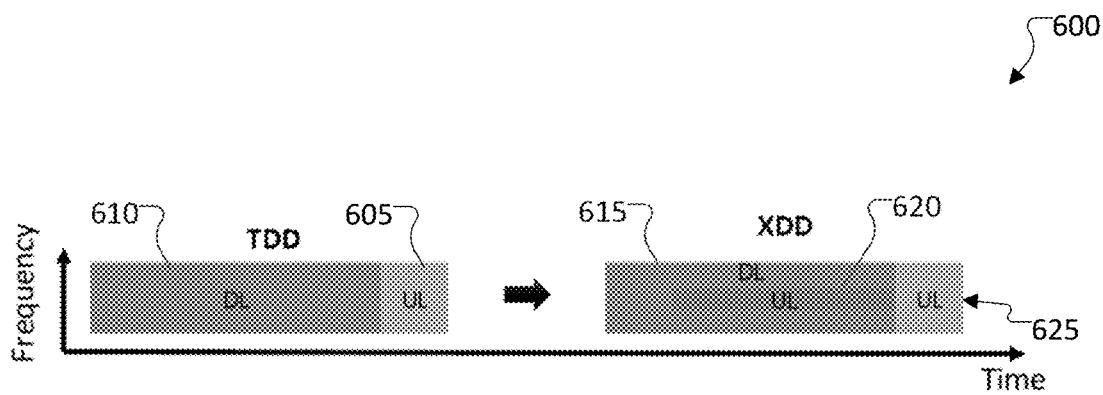
FIG. 6 illustrates examples of a time-division duplex (TDD) communication and a cross-division duplex (XDD) communication according to embodiments of the present disclosure.

FIG. 6 illustrates examples of a time-division duplex (TDD) communication and a cross-division duplex (XDD) communication according to embodiments of the present disclosure. The embodiments of the FDD and XDD communications 600 shown in FIG. 6 are for illustration only. Other embodiments can be used without departing from the scope of the present disclosure.

Modern cellular communication systems typically operate in either Time Division Duplexing (TDD) mode or in Frequency Division Duplexing (FDD) mode to accommodate bidirectional communication. In TDD mode, the uplink (UL) 605 and downlink (DL) 610 operate in distinct time slots, whereas in FDD mode they operate in distinct frequency bands.

There are several key tradeoffs between TDD and FDD systems, a prominent example of which can be seen in uplink coverage. TDD systems bound uplink duration in the time domain, while FDD systems do not. With UEs having limited power, this can constrain the coverage, especially as the operating bandwidth (BW) is increased. TDD systems have the advantage of not requiring large bandwidth gaps between up and downlink channels. More complicated schemes have provided a way in which these frequency bands can be utilized simultaneously, leveraging the benefits of both: XDD and Full-Duplex (FD) systems.

In FD systems, the uplink and downlink operate in the same time/frequency resources. This duplexing ultimately leads to extreme self-interference (SI) problems as almost all of a base station's transmitter power will appear on its uplink receiver. Moreover, there may also be significant interference from adjacent channel leakage due to power amplifiers (PAs) in nearby high-power base stations operating in adjacent channels.

XDD is a new paradigm that provides a unique compromise between FDD and TDD, leveraging the benefits of both. An XDD system is one in which simultaneous downlink 615 and uplink 620 are achieved in the same contiguous band 625, gaining FDD benefits in an unpaired TDD band. A portion of DL is assigned to UL while the DL is operating and transmitting adjacent channel power (ACP) in the UL band. Relying on a minimal guard band between uplink and downlink usually is not possible due to the substantial adjacent channel leakage from the downlink transmitter interfering with the intended received signal.

In certain embodiments, a self-interference cancelation (SIC) technique is required to alleviate self-interference (SI). This cancelation can be done digitally where the system aligns and removes an estimate of the transmitted signal in the DL band from the incoming received signal in the UL band. While the system knows the original baseband waveform it transmitted, the effects of multiple analog components and a channel must be accounted for when estimating the SI. In particular, the PAs introduce extreme nonlinear distortion. Accurately modeling and applying self-interference cancelation using it is practically challenging, especially in multiple-in multiple-out (MIMO) systems where there may be many transmitters and receivers at the base station.

A Generalized Memory Polynomial (GMP) is typically used to model a PA or its inverse for SIC and Digital Predistortion (DPD), respectively. GMPs include multiple nonlinearities and memory effects to model a device accurately. However, these models can quickly grow to include hundreds of parameters. Therefore, fitting a GMP to a particular system, especially a MIMO system, has high computational complexity.

While GMPs are popular for DPD applications, they are often not sufficient for SIC applications. In DPD, the goal is to linearize a PA to meet a spectral mask requirement. Hence, the GMP model needs to be just large enough to accomplish this task. In XDD and FD systems, the goal is to cancel SI to the receiver noise floor, requiring higher accuracy in the model and much more complexity. Moreover, to maintain SIC performance near the noise floor, GMP-based systems need frequent updating of the models as any device operation changes, for example, due to temperature changes, will degrade SIC performance. This problem is exacerbated in MIMO systems where each transmitter's nonlinearities may be present on each receiver, requiring multiple high-complexity GMP models to need to be maintained and computed. Removing the self-interference is critical for FD and XDD operations, and there is a need for a low-complexity solution that can do so in MIMO systems.

Figure 7:
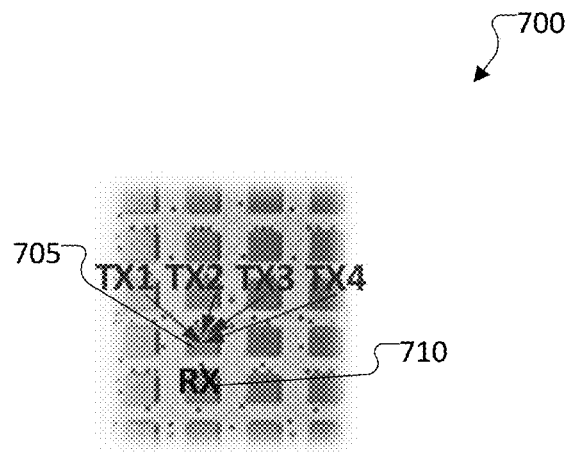
FIG. 7 illustrates an example of a multiple antenna array according to embodiments of the present disclosure.

FIG. 7 illustrates an example of a multiple antenna array 700 according to embodiments of the present disclosure. The embodiment of the multiple antenna array 700 shown in FIG. 7 is for illustration only. Other embodiments can be used without departing from the scope of the present disclosure.

In certain embodiments, an XDD system antenna includes a plurality of antenna ports comprising N transmit antennas and M receive antennas, where M and N are integers. As shown in the example depicted in FIG. 7, in a MIMO system, multiple transmitted downlink (DL) signals can interfere with a single received uplink (UL) signal.

Figure 8:
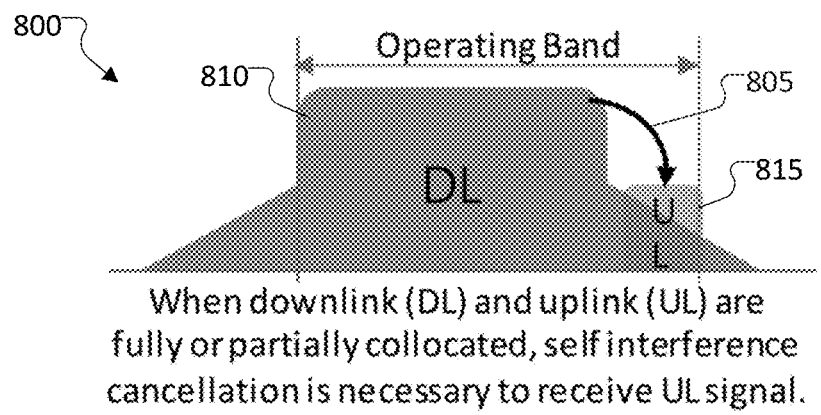
FIG. 8 illustrates examples of self-interference according to embodiments of the present disclosure.

FIG. 8 illustrates examples of self-interference according to embodiments of the present disclosure. The embodiment of the SI 800 shown in FIG. 8 is for illustration only. Other embodiments can be used without departing from the scope of the present disclosure.

In MIMO systems operating in XDD or FD modes, the transmit signal from each transmit antenna will interfere with each received signal at each received antenna. Traditional self-interference cancelation solutions used in single-input single-output (SISO) systems are not applicable because:

Coupling 805 can occur between the DL signal on a transmit antenna to all receive antennas receiving UL 815. Multiple transmit signals interfere with the receive antennas with arbitrary time and phase offsets. The coupling 805 between a TX antenna and an RX antenna has a unique frequency response that depends on the location of the two antennas with respect to each other as well as within the antenna panel. Additional crosstalk may exist in the MIMO system that interferes with the ability to simply use a single input—single output (SISO) approach on all pairs of TX and RX antennas independently.

Figure 9:
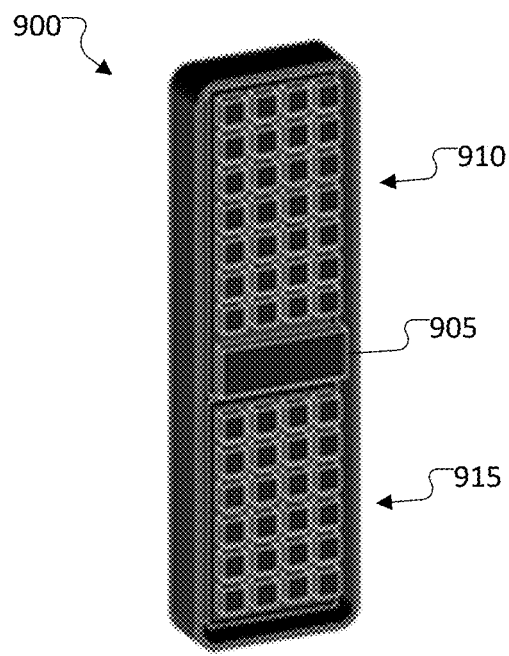
FIG. 9 illustrates another example of a multiple antenna array according to embodiments of the present disclosure.

FIG. 9 illustrates another example of a multiple antenna array according to embodiments of the present disclosure. The embodiment of the multiple antenna array 900 shown in FIG. 9 is for illustration only. Other embodiments can be used without departing from the scope of the present disclosure.

In certain embodiments, an XDD system antenna includes a plurality of antenna ports having a separation 905 between transmit and receive antenna ports. In certain embodiments of the present disclosure, various forms of antenna isolation are incorporated to enhance an isolation between transmit antennas and receive antennas. For example, in XDD MIMO systems, an antenna platform such as shown below may be utilized. In the below figure, additional isolation is obtained in the RF domain via the inclusion of isolation barriers between the TX and RX elements or by physically separating the TX antenna array on one section from the RX antenna array in the other section. With large separation, the required isolation can be achieved. However, the size and weight of the base station will become large.

Certain embodiments of the present disclosure provide a system or apparatus, such as a base station, that includes N transmit antennas separated from M receive antennas. The antennas may be partitioned on the same antenna panel or may be located on multiple antenna panels. Each antenna is associated with a respective transmit path or receive path. Each transmit path contains a power amplifier (PA) with appropriate matching and isolation circuitry before connecting to the antenna. Additionally, each transmit (TX) path has a feedback path coupled from the output of the PA to an equalizer and SIC canceler, which are coupled to a receive (RX) path. In certain embodiments, there is a corresponding RX path for each TX path.

In certain embodiments, the apparatus includes a processor and equalizer configured to learn the channel between each TX path and each receive path using the feedback path, such that a combination of feedback signals passed through the learned channel model can be used to estimate the SI at each receiver, which is due to the TX signal leaking into the RX path through the TX and RX antennas. The apparatus also includes SIC circuitry configured to subtract the estimated SI signal from a received signal, leaving only a residual signal, which is the intended up link signal.

Figure 10:
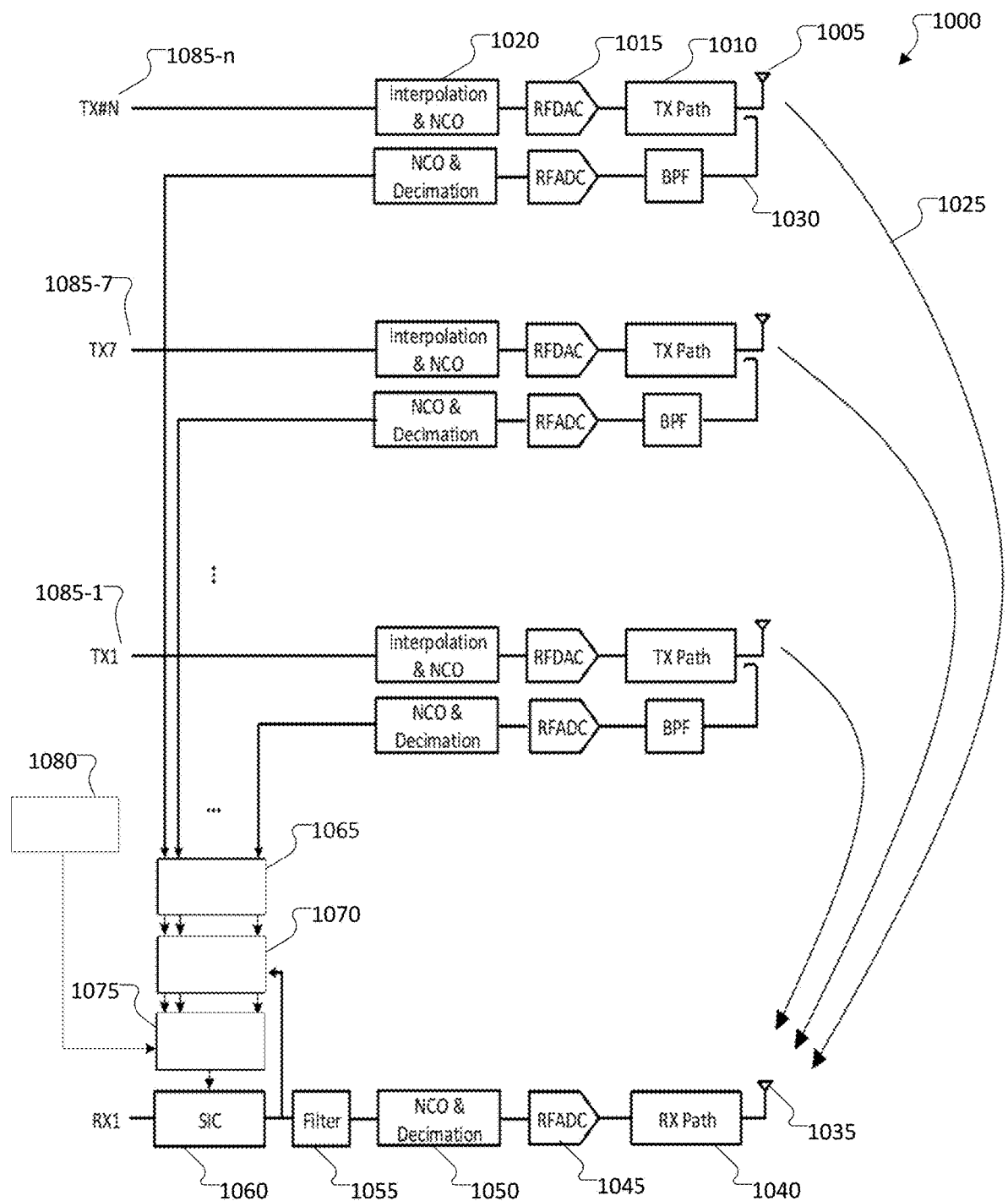
FIG. 10 illustrates an example transceiver system according to embodiments of the present disclosure.

FIG. 10 illustrates an example transceiver system according to embodiments of the present disclosure. The embodiment of the transceiver 1000 shown in FIG. 10 is for illustration only. Other embodiments can be used without departing from the scope of the present disclosure. The transceiver 1000 can be the same as or similar to transceiver 210 or transceiver 310.

The transceiver 1000 includes a number (N) transmit antennas 1005. Each transmit antenna 1005 is coupled to a respective TX path 1010, a radio frequency-digital to analog converter (RF-DAC) 1015, and a numerically controlled oscillator (NCO) 1020. The TX path 1010 can include a power amplifier. In certain embodiments, the NCO 1020 can include a digital predistortion module (DPD).

The transceiver 1000 is configured to receive and transmit an OFDM signal 1025. The transceiver 1000 also includes a feedback (FB) path 1030 that receives a copy of the transmitted OFDM signal 1025 and a receive antenna 1035 coupled to a receive (RX) path 1040, which is configured to receive another signal. In certain embodiments, such as in XDD communication, the transceiver 1000 is configured to concurrently operate in the UL and the DL. In such scenarios, leakage from a signal transmitted by the transmit can overlap, in time and frequency bands, with a signal received by the receive path. For example, if the transmit path 1010 is transmitting in the DL and the receive path 1040 is concurrently receiving in the UL, the receive path 1040 may also receive a portion of the DL signal that is leaking over into the time and frequency bands being used for the UL since there is no guard band to separate the DL and UL communications.

The RX path 1040 is configured to receive a receive signal and can include a low noise amplifier, a down-conversion mixer, an analog baseband filter, an analog gain, and an A/D converter. Additionally, the RX path 1040 is coupled to a RF-ADC 1045, a receive NCO 1050, a filter 1055, and self-interference canceler (SIC) 1060. The SIC 1060 is coupled to the FB path 1030 via a filter 1065, an alignment circuit 1070, and an equalizer 1075. Each of the components illustrated in the example shown in FIG. 10 can be implemented by hardware and circuitry configured to perform the respective functions. For example, each of the filter 1065, alignment circuit 1070, equalizer 1075, and SIC 1060 can be implemented by suitable, hardware, circuitry, and processing circuitry to perform the respective functions. Additionally, each of the filter 1065, alignment circuit 1070, and equalizer 1075 can include multiple circuits wherein each of the circuits is coupled to a respective FB path 1030 from each of the TX paths 1010. For example, the filter 1065 can include N filters, each coupled to a respective one of the N TX paths 1010; the alignment circuit 1070 can include N alignment circuits, each coupled to a respective output of the N filters 1065; and the equalizer 1075 can include N equalizers, each coupled to a respective output of the N alignment circuits 1070.

The transceiver 1000 is coupled to, or includes, a processor 1080. For example, the processor 1080 can be the same as, or similar to, controller/processor 225 or processor 340. The processor 1080 is configured to set or revise one or more parameters of the equalizer 1075. For example, the processor 1080 is configured to set one or more coefficients of an equalizer function performed or used by the equalizer 1075.

To estimate the self-interference (SI), the processor 1080 transmits a known signal 1085-1 through 1085-n on all transmitters simultaneously. The processor 1080 can transmit the same known signal on all the TX paths 1010 or the processor 1080 can transmit a different known signal on different ones of the TX paths 1010. For example, the first known signal 1085-1 can be the same as the seventh known signal 1085-7; but different from the $N^{th}$ known signal 1085-n. Alternatively, the first known signal 1085-1 can be different from the seventh known signal 1085-7 and different from the $N^{th}$ known signal 1085-n.

In certain embodiments, the processor 1080 formulates a global least-squares problem to jointly learn equalizers from the FB paths 1010 of all transmitters to the RX paths 1040 to optimally learn the equalizer functions for equalizers 1075. The processor 1080 models the equalizers 1075 after the individual interference channels from each transmitter to each receiver. The learned channel may include a variety of standard channel effects such as multi-tap effects due to multiple reflections.

The feedback signals are passed through these learned channels (the filter 1065, alignment circuit 1070, and equalizer 1075) in the digital domain to estimate the self-interference on each received signal. For each receiver, the SIC 1060 subtracts the self-interference (SI) estimate from the signal received via receive antenna 103. After subtracting the SI from the received signal, a residual signal is obtained. The residual signal is the intended uplink signal on each receiver and will have improved SINR and, consequently, improved channel capacity.

Accordingly, embodiments of the present disclosure use a combination of filtered feedback signals to cancel each received interference signal. Embodiments of the present disclosure provide for a learning phase in which coefficients for an equalizer function are established and an application phase in which the learned equalizer function is used to estimate SI and the SI is subtracted from a received signal to obtain an intended UL signal.

In certain embodiments, a system for XDD signal interference cancelation is configured to learn one or parameters to perform SI cancelation for each receiver with respect to each transmitter. In certain embodiments, the system is further configured to use the learning parameters to revise existing parameters for SI cancelation. In certain embodiments, the system includes a processor 1080 configured to learn the one or more parameters to perform SI cancelation. To conduct the learning phase, the processor 1080 performs the following.

The baseband equivalent transmit signal on antenna i is represented by the discrete signal $x_i[l]$ where l indexes the samples of the signal. Similarly, $\tilde{x}_i[l]$ and $y_j[l]$ represent the feedback signal for the $i^{th}$ PA and the receive signal for the $j^{th}$ receiver port, respectively. The processor 1080 learns FIR filters of length K, $h_{i,j}[k]$, that minimize the squared error between all N feedback signals and the $j^{th}$ receive signal as shown in Eq. 1:

$$h_{i,j}[k] = \underset{h_{i,j}[k]}{\mathrm{argmin}} \left\| y_j[l] - \sum_{k=1}^{N} h_{i,j}[k] * \tilde{x}_i[l] \right\|^2. \qquad (1)$$

The processor 1080 solves the least-squares over all filters $h_{i,j}[k]$ simultaneously, hence the name "Global" SIC. To solve this, the processor 1080 formulates the system in an equivalent matrix formulation and utilizes the least-squares solution. For the matrix based formulation, each signal is written as an L×1 vector of samples, $x_i=[x(0) \; x(1) \; \ldots \; x(L-1)]^T$. For notational convenience, a signal $x[l]$ is considered as delayed by k samples as $x_i^{(k)}=[0_k \; x(0) \; x(1) \; \ldots \; x(L-1-k)]^T$, where $0_k$ represents the 1×k dimensional zero vector. This yields the optimization problem as shown in Eq. 2:

$$h_j = \underset{h_j}{\mathrm{argmin}} \left\| y_j - \tilde{X} h_j \right\|_2. \qquad (2)$$

In Equation 2, $h_j=[h_{1,j} \ldots h_{N,j}]^T$ is the concatenation of all filter coefficients for all N feedback signals to the $j^{th}$ receive signal and X is constructed as shown in Eq. 3:

$$\tilde{X} = [\tilde{x}_1^{(0)} \ldots \tilde{x}_1^{(K-1)} \tilde{x}_2^{(0)} \ldots \tilde{x}_N^{(K-1)}]. \qquad (3)$$

With this, the solution is given through canonical least-squares as shown in Eq. 4:

$$h_j = (\tilde{X}^H \tilde{X})^{-1} \tilde{X}^H y_j. \qquad (4)$$

In Equation 4, H represents the Hermitian transpose. The processor 1080 solves equation 4 for all j. Once solved, the concatenated solution can be separated into individual impulse responses $h_{i,j}[k]$ for all i. The processor 1080 updates the equalizer 1075 based on the solutions of Equations 1-4.

Once the processor 1080 learns and updates the parameters for the equalizer function for equalizer 1075, the equalizer 1075 can apply each FIR filter 1065 to compute the $j^{th}$ residual, $u_j[l]$, on each receive signal as shown in Eq. 5:

$$u_j[l] = y_j[l] - \Sigma_{i=1}^{N} h_{i,j}[k] * x_i[l]. \quad (5)$$

Each residual is the received signal vector once the SI has been removed.

Figure 11:
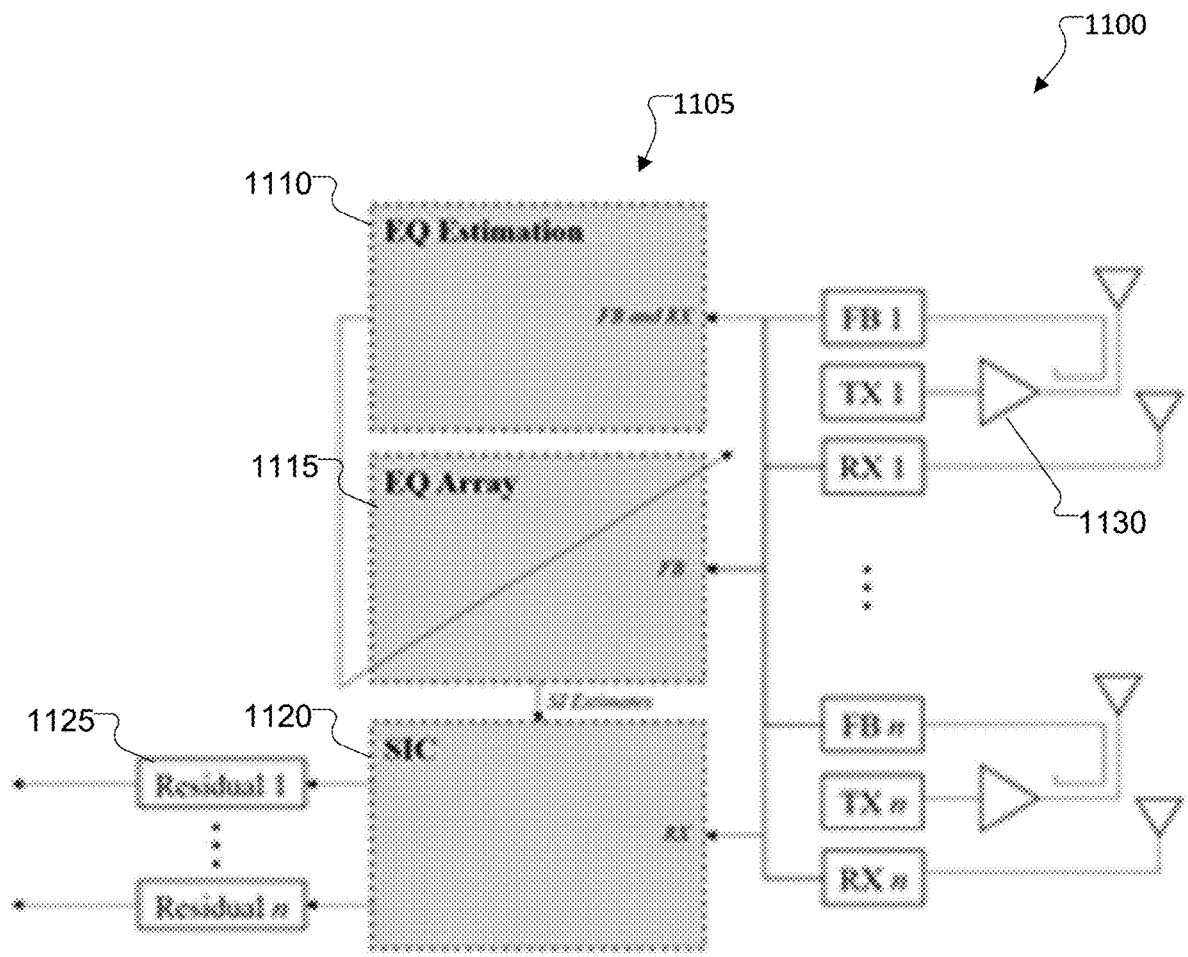
FIG. 11 illustrates an example transceiver system with a global equalizer according to embodiments of the present disclosure.

FIG. 11 illustrates an example transceiver system with a global equalizer according to embodiments of the present disclosure. The embodiment of the transceiver 1100 shown in FIG. 11 is for illustration only. Other embodiments can be used without departing from the scope of the present disclosure. The transceiver 1100 can be the same as or similar to transceiver 210 or transceiver 310.

In certain embodiments, transceiver 1100 includes a global equalizer SIC 1105. The global equalizer SIC includes an equalizer (EQ) Estimation 1110, EQ Array 1115, and SIC 1120. Each of the components illustrated in the example shown in FIG. 11 can be implemented by hardware and circuitry configured to perform the respective functions. For example, EQ Estimation 1110 can be implemented by processor 1080. The EQ Estimation 1110 receives, as inputs, both FB and RX signals. The EQ Estimation 1110 estimates the channel transformation (equalizer) between each FB and RX signal, and outputs the ensemble of learned equalizers. The EQ Array 1115 receives, as inputs, FB signals. The EQ Array 1115 outputs an SI Estimate for each RX signal. The SIC 1120 receives the SI Estimate from the EQ Array 1115. The SIC 1120 subtracts each input SI Estimate from each RX signal and outputs Residual signals 1125 for each received signal. The residual signals correspond to interference-free RX signals.

Figure 12:
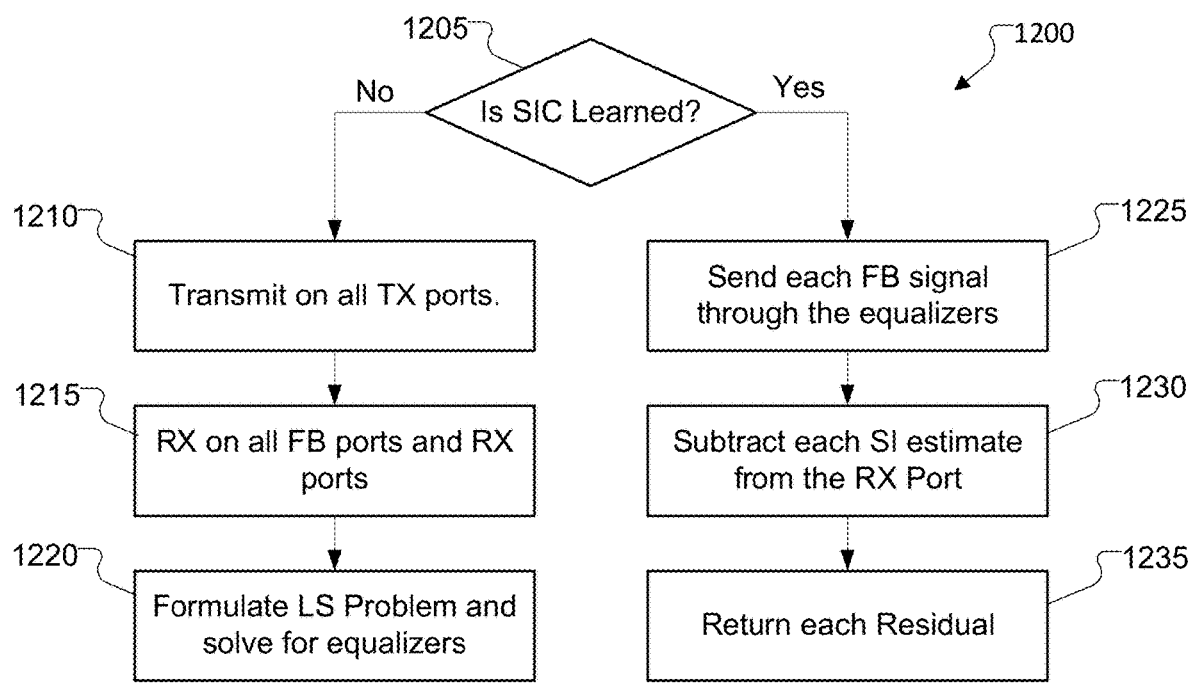
FIG. 12 illustrates a self-interference cancelation process according to embodiments of the present disclosure.

FIG. 12 illustrates a self-interference cancelation process 1200 according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter and processor circuitry in, for example, a base station. Process 1200 can be accomplished by, for example, gNB 102.

In operation 1205, a determination is made regarding whether equalizer coefficients for the equalizer function for SIC has been learned. Before SIC can be performed, the equalizers need to be learned. If it is determined that the equalizer coefficients need to be learned, in operation 1210, to learn the coefficients for each equalizer, the system broadcasts signals on all transmitters in the array. As shown in the example depicted in FIG. 11, the feedback (FB) paths are coupled to the output of each transmit path, capturing all the nonlinearities created by the power amplifier 1130. In operation 1215, all FB and RX paths are sent to and received by the EQ Estimation 1110. In operation 1220, the EQ Estimation 1110 performs a least squares (LS) estimation to jointly learn equalizer functions from each FB path to each RX path. Each equalizer function here is a learned interference channel between each amplified transmit signal to each received signal.

Once each equalizer function is learned through the LS, the EQ Array 1115 is updated. In certain embodiments, the processor 1080 is configured to update existing equalizer functions, such as when a degradation has occurred in the system. During the application phase, in operation 1225, all the FB signals are passed through each of the equalizers and linearly combine them to create a total estimated self-interference (SI) signal for each RX port. The EQ Array 1115 passes the SI signals to the SIC 1120. In operation 1230, the SIC 1120 subtracts the SI Estimate from each RX signal. In operation 1235, the SIC 1120 then returns the residuals in which the SI signals have been removed. The residual leftover contains only the uplink signal with an improved SINR.

In certain embodiments, the equalizer estimation is performed using a technique apart from least squares. That is, the processor 1080 can perform the equalizer function estimation using gradient descent, a least mean square (LMS), minimum mean square error (MMSE), recursive least-squares, or a gradient decent, Machine Learning, and the like. In certain embodiments, the equalizer function estimation includes modifications to least squares, such as the use of regularizers, such as Tikhonov and lasso. These techniques are refinements on the channel estimation and can be tailored to specifics of the channel known a priori. As such, these regression techniques do not change the fundamental contribution of the antenna and can be considered as tuning for a specific use-case or implementation.

In certain embodiments, the equalizer estimation is performed using other digital signal processing (DSP) transformations on the various signal. For example, the feedback and receive signals can be filtered to focus the learning into a specific frequency range. Moreover, the equalizer estimation also can include any sort of time-shift that may need to be applied to give the appropriate alignment between the feedback and receive signals. The processor 1080 can use digital pre-distortion (DPD) on the input signals is also included.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. An apparatus comprising:
    a transceiver configured to communicate via an uplink channel and a downlink channel concurrently;
    a first number of transmit antennas;
    a second number of receive antennas;
    a first number of feedback paths respectively coupled to the first number of transmit antennas, each of the feedback paths configured to:
        receive a copy of an analog transmit signal from the respective transmit antenna, and
        convert the copy of the analog transmit signal to a digital feedback signal;
    an equalizer coupled to the feedback paths and configured to, for at least one receive antenna of the second number of receive antennas:

receive the digital feedback signals, wherein one of the digital feedback signals is received for each of the first number of transmit antennas from the respective feedback path, and calculate, based on the digital feedback signals and an equalizer function, a self-interference (SI) estimate for the at least one receive antenna; and self-interference cancel (SIC) circuitry configured to, for the at least one receive antenna of the second number of receive antennas, subtract the SI estimate from a signal received at the at least one of the second number of receive antennas to obtain a residual signal.

2. The apparatus of claim 1, further comprising a processor configured to set or revise the equalizer function by:

calculating a number of coefficients for the equalizer function for each of the second number of receive antennas.

3. The apparatus of claim 2, wherein to calculate the number of coefficients for the equalizer function, the processor is configured to:

transmit known signals respectively through each of the first number of transmit antennas;

receive, by at least one receive path coupled to the at least one receive antenna, a number of output signals from a first number of transmit paths coupled respectively to the first number of transmit antennas; and estimate, based on the known signals and the output signals, a SI at the at least one receive antenna.

4. The apparatus of claim 1, wherein the equalizer is configured to calculate the SI estimate using one of: least mean squares (LMS), recursive least-squares, or a gradient descent, and wherein the equalizer is configured to model a coupling between each transmit antenna and each receive antenna.

5. The apparatus of claim 1, further comprising one or more filters configured to filter at least one of the analog transmit signals transmitted by at least one of the first number of transmit antennas, or the signal received by the at least one receive antenna.

6. The apparatus of claim 1, wherein the first number of feedback paths each comprise one or more of:
a radio frequency (RF) coupler with an attenuation circuit;
a digital pre-distortion estimation circuit;
up/down conversion mixers;
drivers;
low noise amplifiers; and
local oscillator (LO) paths with phase locked loop (PLL).

7. The apparatus of claim 1, further comprising a receive path coupled to the at least one receive antenna, the receive path comprising:
a radio frequency-analog to digital converter (RF-ADC); and
a numerically controlled oscillator (NCO).

8. A method comprising:
transmitting, by a transceiver configured to communicate via an uplink channel and a downlink channel concurrently, one or more analog transmit signals, the transceiver comprising:
a first number of transmit antennas;
a second number of receive antennas, and
a first number of feedback paths respectively coupled to the first number of transmit antennas;
receiving, at each of the feedback paths, a copy of an analog transmit signal from the respective transmit antenna;

converting, by each of the feedback paths, the copy of the analog transmit signal to a digital feedback signal;
for at least one receive antenna of the second number of receive antennas:
receiving, at an equalizer coupled to the feedback paths, the digital feedback signals, wherein one of the digital feedback signals is received for each of the first number of transmit antennas from the respective feedback path;
calculating, using the equalizer based on the digital feedback signals and an equalizer function, a self-interference (SI) estimate for the at least one receive antenna; and
subtracting, in a self-interference cancel (SIC) circuitry, the SI estimate from a signal received at the at least one receive antenna of the second number of receive antennas to obtain a residual signal.

9. The method of claim 8, further comprising setting or revising the equalizer function by:
calculating a number of coefficients for the equalizer function for each of the second number of receive antennas.

10. The method of claim 9, wherein calculating the number of coefficients for the equalizer function further comprises:
transmitting known signals respectively through each of the first number of transmit antennas;
receiving, by at least one receive path coupled to the at least one receive antenna, a number of output signals from a first number of transmit paths coupled respectively to the first number of transmit antennas; and
estimating, based on the known signals and the output signals, a SI at the at least one receive antenna.

11. The method of claim 8, wherein the equalizer is configured to calculate the SI estimate using one of: least mean squares (LMS), recursive least-squares, or a gradient descent, and
wherein the equalizer is configured to model a coupling between each transmit antenna and each receive antenna.

12. The method of claim 8, further comprising filtering, by one or more filters, at least one of the analog transmit signals transmitted by at least one of the first number of transmit antennas, or the signal received by the at least one receive antenna.

13. The method of claim 8, wherein:
the first number of feedback paths each comprise one or more of:
a radio frequency (RF) coupler with an attenuation circuit;
a RF receiver path;
a digital pre-distortion estimation circuit;
up/down conversion mixers;
drivers;
low noise amplifiers; and
local oscillator (LO) paths with phase locked loop (PLL).

14. The method of claim 8, further comprising receiving, by a receive path coupled to the at least one receive antenna, the one or more analog transmit signals, the receive path comprising:
a radio frequency-analog to digital converter (RF-ADC); and
a numerically controlled oscillator (NCO).

15. A non-transitory computer readable medium comprising a plurality of instructions that, when executed by at least one processor, cause an electronic device to:

transmit, via a transceiver configured to communicate via an uplink channel and a downlink channel concurrently, one or more analog transmit signals, the transceiver comprising:
  a first number of transmit antennas,
  a second number of receive antennas, and
  a first number of feedback paths respectively coupled to the first number of transmit antennas;
receive, at each of the feedback paths, a copy of an analog transmit signal from the respective transmit antenna;
convert, by each of the feedback paths, the copy of the analog transmit signal to a digital feedback signal;
for at least one receive antenna of the second number of receive antennas:
  receive, at an equalizer coupled to the feedback paths, the digital feedback signals, wherein one of the digital feedback signals is received for each of the first number of transmit antennas from the respective feedback path;
  calculate, using the equalizer based on the digital feedback signals and an equalizer function, a self-interference (SI) estimate for the at least one receive antenna; and
  subtract the SI estimate from a signal received at the at least one receive antenna of the second number of receive antennas to obtain a residual signal.

16. The non-transitory computer readable medium of claim 15, wherein the plurality of instructions, when executed by the at least one processor, further cause the electronic device to set or revise, using the processor, the equalizer function by:
  calculating a number of coefficients for the equalizer function for each of the second number of receive antennas.

17. The non-transitory computer readable medium of claim 16, wherein the plurality of instructions, when executed by the at least one processor, further cause the electronic device to calculate, using the processor, the number of coefficients for the equalizer function by:
  transmitting known signals respectively through each of the first number of transmit antennas;
  receiving, by at least one receive path coupled to the at least one receive antenna, a number of output signals from a first number of transmit paths coupled respectively to the first number of transmit antennas; and
  estimating, based on the known signals and the output signals, a SI at the at least one receive antenna.

18. The non-transitory computer readable medium of claim 16, wherein the plurality of instructions, when executed by the at least one processor, further cause the electronic device to calculate, using the equalizer, the SI estimate using one of: least mean squares (LMS), recursive least-squares, or a gradient descent, and
  wherein the equalizer is configured to model a coupling between each transmit antenna and each receive antenna.

19. The non-transitory computer readable medium of claim 15, wherein the plurality of instructions, when executed by the at least one processor, further cause the electronic device to:
  filter, via one or more filters, at least one of the analog transmit signals transmitted by at least one of the first number of transmit antennas, or the signal received by the at least one receive antenna.

20. The non-transitory computer readable medium of claim 15, wherein:
  the first number of feedback paths each comprise one or more of:
    a radio frequency (RF) coupler with an attenuation circuit;
    a RF receiver path;
    a digital pre-distortion estimation circuit;
    up/down conversion mixers;
    drivers;
    low noise amplifiers; and
    local oscillator (LO) paths with phase locked loop (PLL), and
  the plurality of instructions, when executed by the at least one processor, further cause the electronic device to:
    receive, via a receive path coupled to the at least one receive antenna, the one or more analog transmit signals, the receive path comprising one or more of:
      a radio frequency-analog to digital converter (RF-ADC), and
      a numerically controlled oscillator (NCO); and
    subtract the SI estimate from the signal received at the at least one receive antenna using self-interference cancel (SIC) circuitry.

* * * * *